(12) United States Patent
Quackenbush

(10) Patent No.: US 11,029,223 B2
(45) Date of Patent: Jun. 8, 2021

(54) BI-DIRECTIONAL FORCE SENSOR

(71) Applicant: HUD Studios Inc., Duncan (CA)

(72) Inventor: Erik Quackenbush, Duncan (CA)

(73) Assignee: HUD STUDIOS INC., Duncan (CA)

(*) Notice: Subject to any disclaimer, the term of this patent is extended or adjusted under 35 U.S.C. 154(b) by 184 days.

(21) Appl. No.: 16/436,001

(22) Filed: Jun. 10, 2019

(65) Prior Publication Data

US 2019/0376854 A1    Dec. 12, 2019

(30) Foreign Application Priority Data

Jun. 8, 2018   (CA) .................................. CA 3007678

(51) Int. Cl.
| | | |
|---|---|---|
| *G01L 1/00* | (2006.01) | |
| *G01L 1/22* | (2006.01) | |
| *G01L 5/22* | (2006.01) | |
| *B62J 11/00* | (2020.01) | |
| *G01L 5/161* | (2020.01) | |
| *B62J 45/40* | (2020.01) | |

(52) U.S. Cl.
CPC .............. *G01L 1/2206* (2013.01); *B62J 11/00* (2013.01); *G01L 5/161* (2013.01); *G01L 5/225* (2013.01); *B62J 45/40* (2020.02)

(58) Field of Classification Search
CPC ....... G01L 1/2206; G01L 5/161; G01L 5/225; B62J 11/00; B62J 45/40
See application file for complete search history.

(56) References Cited

U.S. PATENT DOCUMENTS

| | | | | |
|---|---|---|---|---|
| 6,608,267 | B2* | 8/2003 | Fischer | H01H 3/14 200/86.5 |
| 2002/0070840 | A1* | 6/2002 | Fischer | H01H 3/14 338/2 |
| 2004/0239486 | A1 | 12/2004 | Li et al. | |
| 2015/0177083 | A1* | 6/2015 | Redmond | A43B 3/0005 702/44 |
| 2019/0163226 | A1* | 5/2019 | Kihara | F02D 11/02 |

FOREIGN PATENT DOCUMENTS

| | | | |
|---|---|---|---|
| CN | 205655849 U | * | 10/2016 |
| KR | 10 1776870 B1 | | 9/2017 |

* cited by examiner

*Primary Examiner* — Jamel E Williams
(74) *Attorney, Agent, or Firm* — Finch & Maloney, PLLC; Michael J. Bujold

(57) ABSTRACT

A bi-directional force sensor which includes a first body and a second body. The first body has a first portion and a second portion. The second body also has a first portion and a second portion. The second body interlocks with the first body with the first portion of the second body positioned between the first portion and the second portion of the first body and the second portion of the first body positioned between the first portion and the second portion of the second body. A first sensor is positioned between the first portion of the first body and the first portion of the second body. A second sensor is positioned between the second portion of the first body and the first portion of the second body. This bi-directional force sensor was developed for use in assessing cycling technique.

4 Claims, 4 Drawing Sheets

BI-DIRECTIONAL FORCE SENSOR

FIELD

The described bi-directional force sensor was developed for use with bicycles, but has wider application.

BACKGROUND

High calibre cyclists use shoes that attach to the pedals of their bicycle. This enables the cyclist to exert a force to pull upward on one pedal, while pressing downward on another pedal. Articles on cycling technique indicate that the upward force should be approximately two thirds of the downward force.

SUMMARY

There is provided a bi-directional force sensor which includes a first body and a second body. The first body has a first portion and a second portion. The second body also has a first portion and a second portion. The second body interlocks with the first body with the first portion of the second body positioned between the first portion and the second portion of the first body and the second portion of the first body positioned between the first portion and the second portion of the second body. A first sensor is positioned between the first portion of the first body and the first portion of the second body. A second sensor is positioned between the second portion of the first body and the first portion of the second body.

The bi-directional force sensor, as described above, senses both a downward force and an upward force. When a downward force is exerted, the first portion of the first body presses the first sensor against the first portion of the second body. When an upward force is exerted, the second portion of the first body presses the second sensor against the first portion of the second body. The sensor data from the first sensor and the second sensor is transmitted to a processor for future review and analysis.

In the preferred embodiment, which will hereinafter be further described, the first body and the second body are U shaped. It will be appreciated that one may modify the shape and configuration of the first body and the second body, as long as the claimed relationship is maintained.

There is a first mounting on the first portion of the first body and a second mounting on the second portion of the second body. In the preferred embodiment, which will hereinafter be further described, the first mounting receives a cycling shoe and the second mounting engages a bicycle pedal. It will be appreciated that, if the bi-directional force sensor is employed in other applications, the first mounting and the second mounting may take other forms suitable for the intended application.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
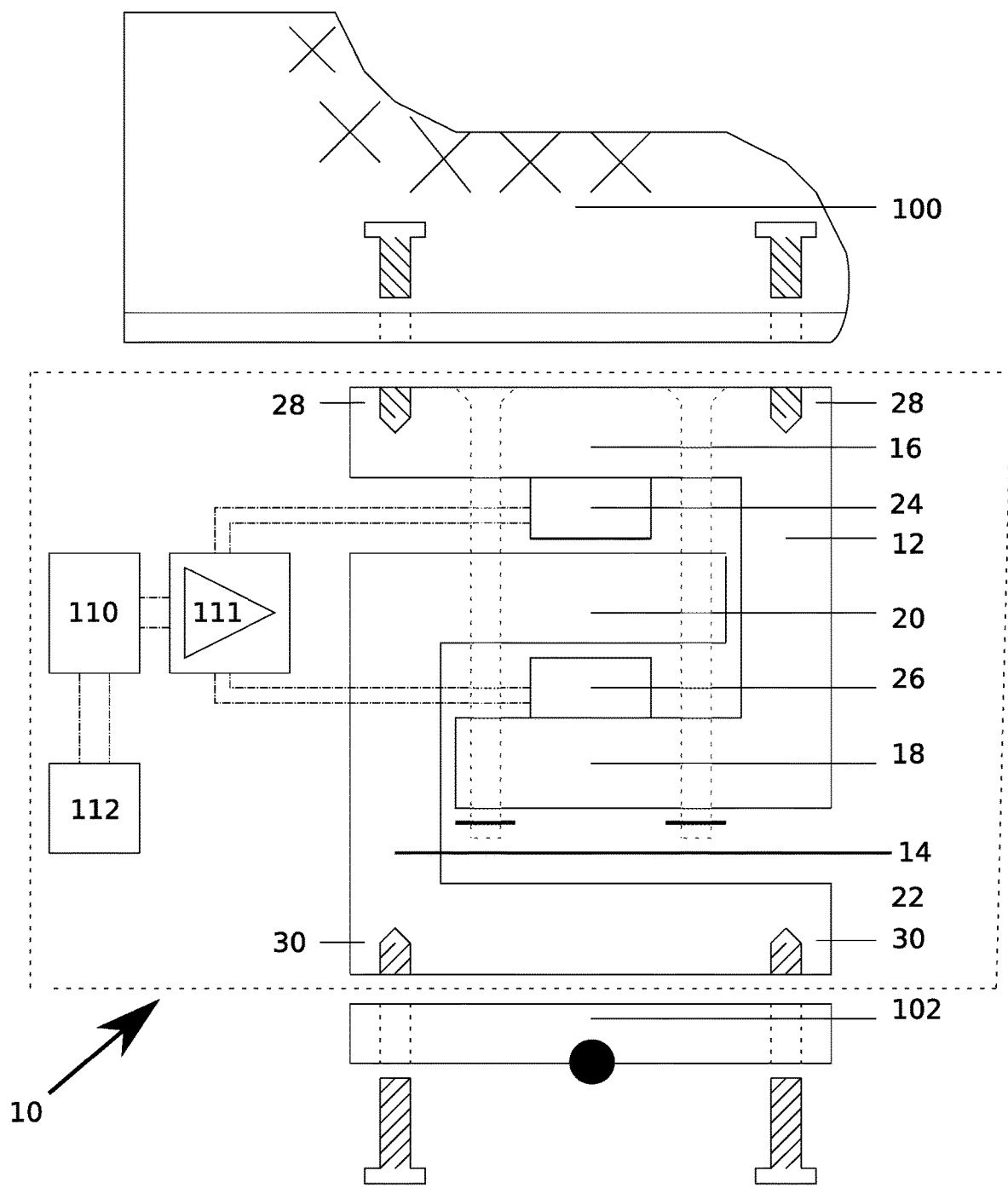
FIG. 1 is a side elevation view, in section, of a bi-directional force sensor.

A bi-directional force sensor generally identified by reference numeral 10, will now be described with reference to FIG. 1 through FIG. 4.

Structure and Relationship of Parts:

Referring to FIG. 1, bi-directional force sensor 10 which includes a first U-shaped body 12 and a second U-shaped body 14. First U-shaped body has a first portion 16 and a second portion 18. Second U-shaped body 14 has a first portion 20 and a second portion 22. The second U-shaped body 14 interlocks with first U-shaped body 12 with first portion 20 of second U-shaped body 14 positioned between first portion 16 and second portion 18 of first U-shaped body 12. Similarly, second portion 18 of first U-shaped body 12 is positioned between first portion 20 and second portion 22 of second U-shaped body 14.

A first sensor 24 is positioned between first portion 16 of first U-shaped body 12 and first portion 20 of second U-shaped body 14. A second sensor 26 is positioned between second portion 18 of first U-shaped body 12 and first portion 20 of second U-shaped body 14. The sensors used are pressure sensitive resistors. These sensors are commercially available under the brand name FlexiForce from Tekscan. Strain gauges could be used as an alternative, but they are thicker and would take up more room.

There is a first mounting 28 on first portion 16 of first U-shaped body 12 and a second mounting 30 on second portion 22 of second U-shaped body 14. First mounting 28 receives a cycling shoe 100 and second mounting 30 engages a bicycle pedal 102.

Figure 2:
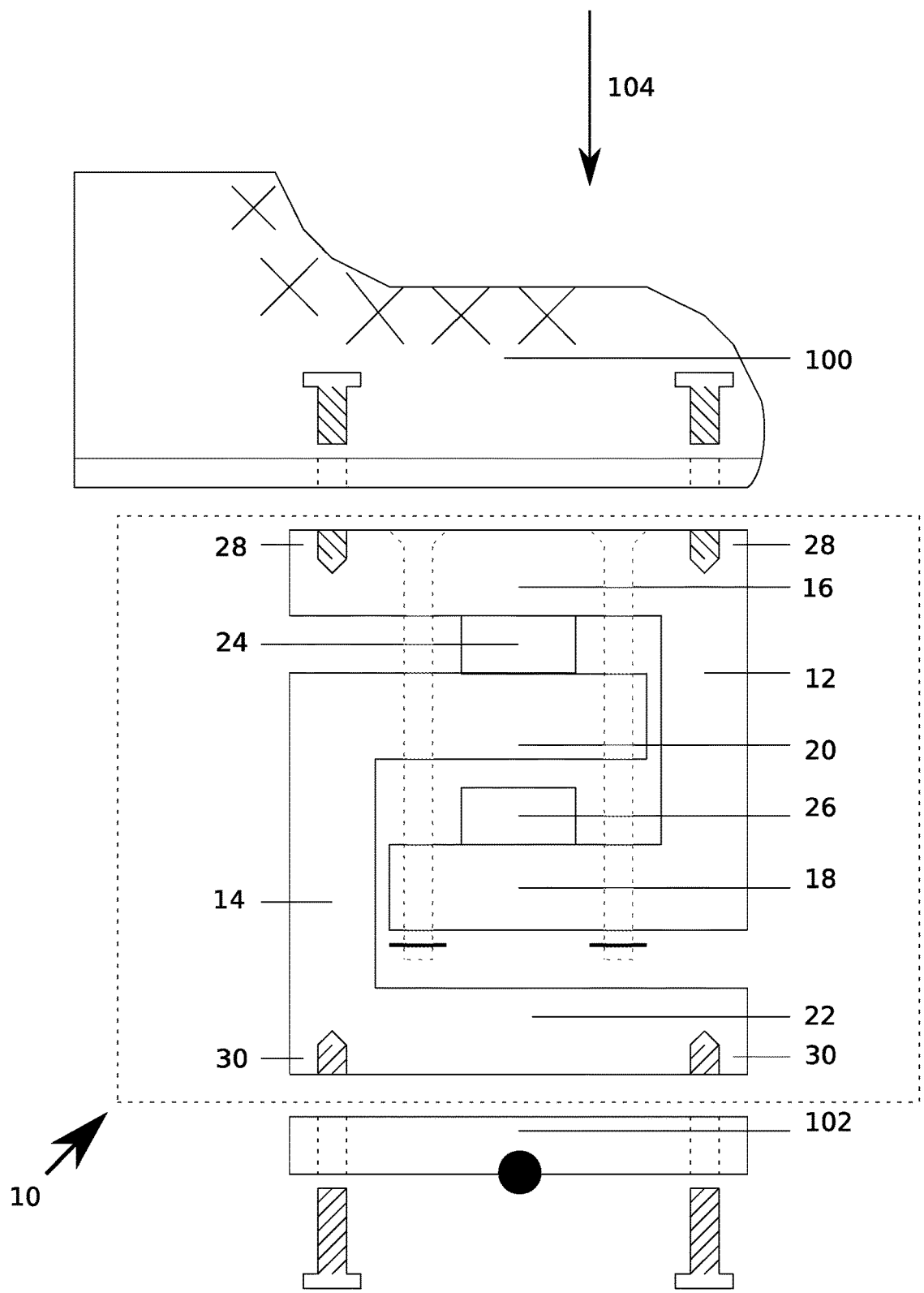
FIG. 2 is a side elevation view, in section, of the bi-directional force sensor of FIG. 1 on a downward stroke.

Operation:

Referring to FIG. 2, when a downward force is exerted as indicated by arrow 104, first portion 16 of first U-shaped body 12 presses first sensor 24 against first portion 20 of second U-shaped body 14.

Figure 3:
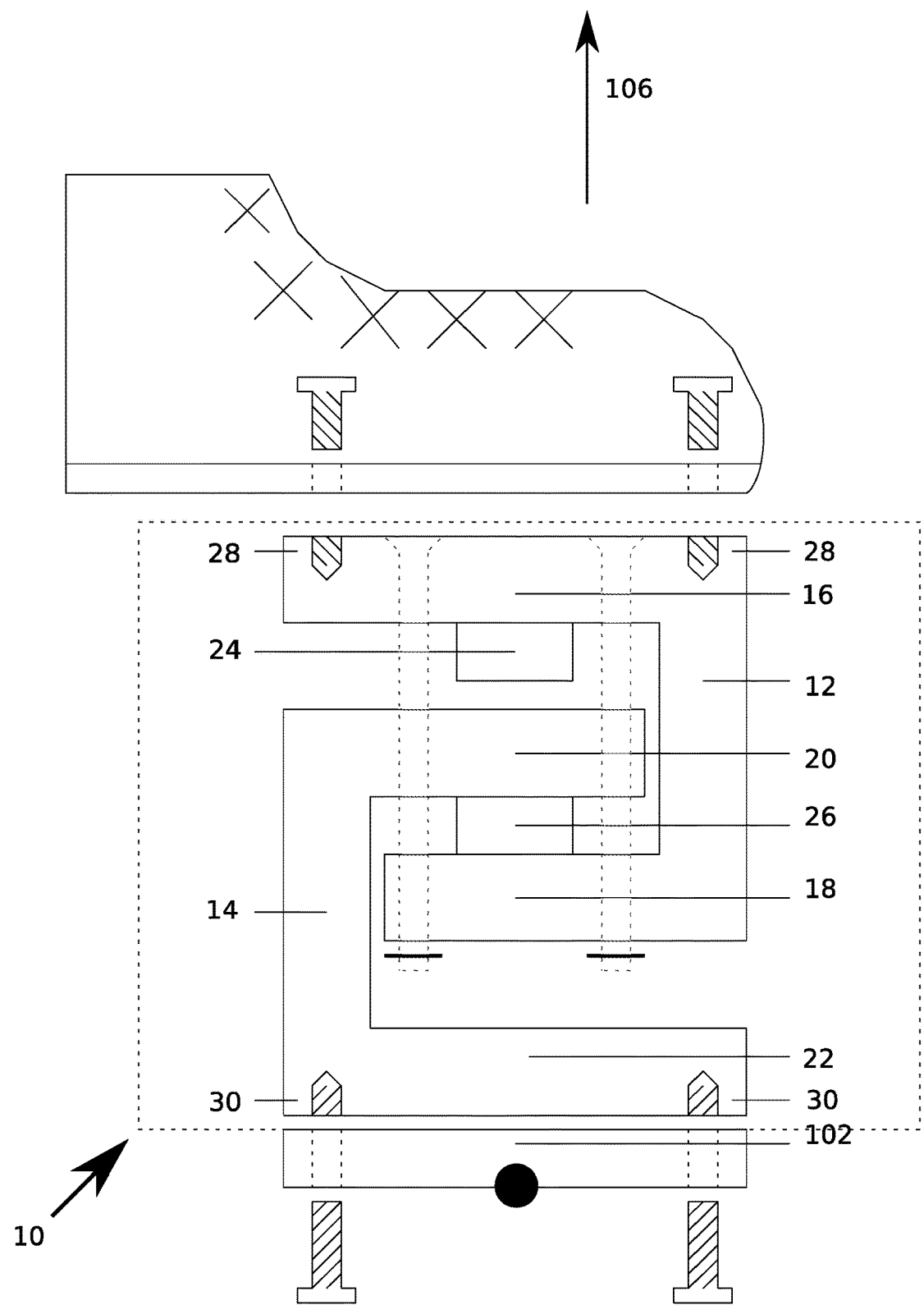
FIG. 3 is a side elevation view, in section, of the bi-directional force sensor of FIG. 1 on an upward stroke.

Referring to FIG. 3, when an upward force is exerted as indicated by arrow 106, second portion 18 of first U-shaped body 12 presses second sensor 26 against first portion 20 of second U-shaped body 14.

Figure 4:
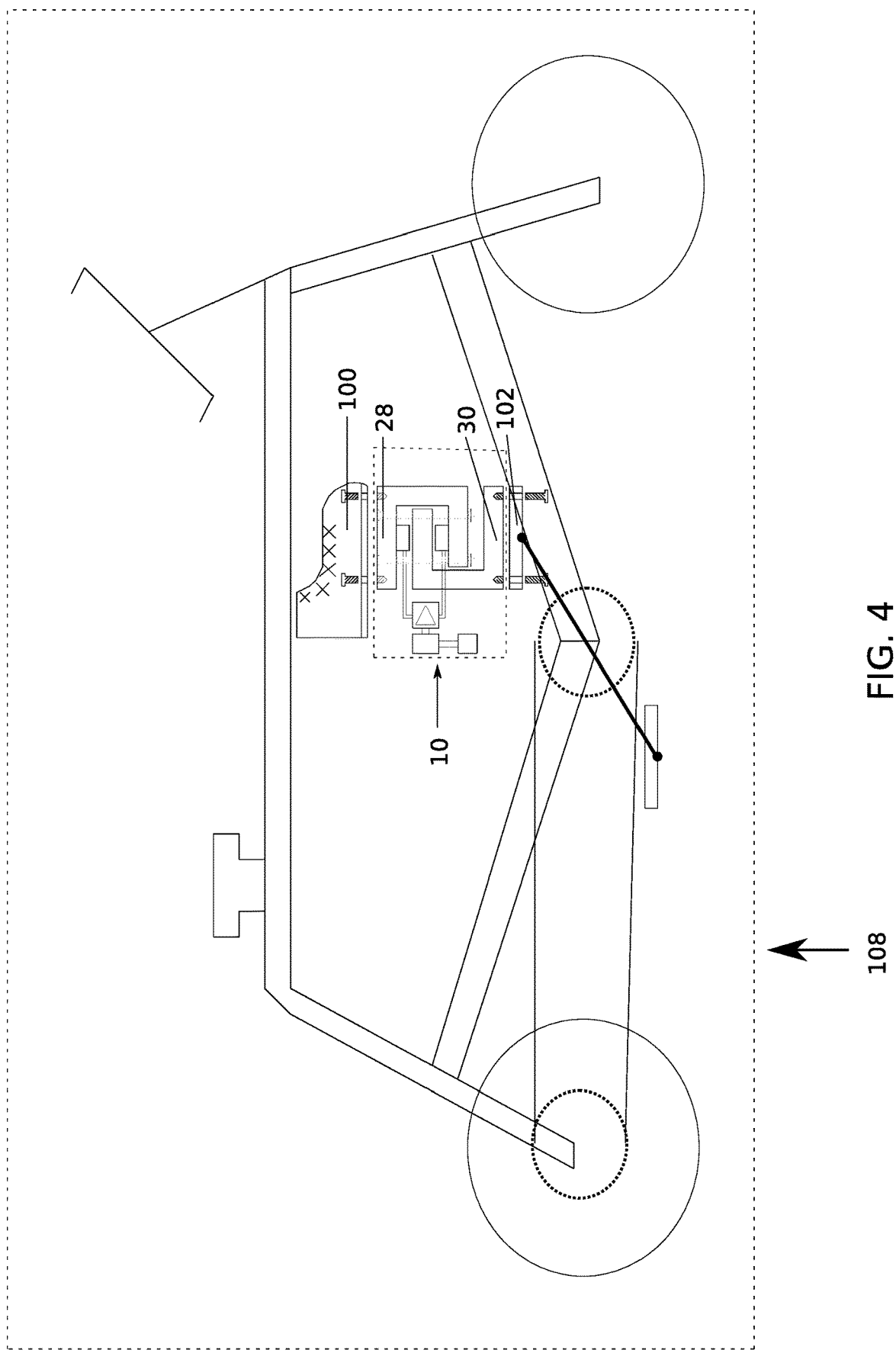
FIG. 4 is a side elevation view of a bicycle equipped with the bi-directional force sensor of FIG. 1 (the bi-directional force sensor has been enlarged for visibility).

It will be understood that sensor data from first sensor 24 and second sensor 26 is transmitted to a processor for future review and analysis. The review and analysis of such data has come to be known as analytics. Analytics is used by coaches and athletes for the purpose of assessing performance. Referring to FIG. 4, a bicycle 108 is shown that has bi-directional force sensor 10 mounted on bicycle pedal 102 by second mounting 30 and a cycling shoe 100 attached by first mounting 28.

There are various ways that data from bi-directional sensor 10 may be recovered for review and analysis. Chosen for illustration is a processor 110 mounted to pedal 102 of bicycle 108. The signal coming from the sensors to processor 110 must be conditioned. This conditioning block is identified by reference numeral 111. A voltage from a regulator is passed through each force sensor to an operational amplifier to condition each signal. This converts each resistance to a full scale voltage that is measured by an analog to digital converter. If desired, processor 110 may be equipped with Bluetooth transceivers 112, so that sensor data may be transmitted wirelessly.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A bi-directional force sensor, comprising:
   a first body having a first portion and a second portion;
   a second body having a first portion and a second portion, the second body interlocking with the first body with the first portion of the second body positioned between the first portion and the second portion of the first body and the second portion of the first body positioned between the first portion and the second portion of the second body;
   a first sensor positioned between the first portion of the first body and the first portion of the second body; and
   a second sensor positioned between the second portion of the first body and the first portion of the second body.

2. The force sensor of claim 1, wherein the first body and the second body are U shaped.

3. The force sensor of claim 1, wherein a first mounting on the first portion of the first body and a second mounting on the second portion of the second body.

4. The force sensor of claim 2, wherein the first mounting is a shoe clip and the second mounting is a bicycle pedal.

* * * * *